US008903208B2

(12) United States Patent
Park et al.

(10) Patent No.: US 8,903,208 B2
(45) Date of Patent: Dec. 2, 2014

(54) WAVEGUIDE WITH REDUCED PHASE ERROR AND PHOTONICS DEVICE INCLUDING THE SAME

(71) Applicant: Electronics and Telecommunications Research Institute, Daejeon (KR)

(72) Inventors: Jaegyu Park, Daejeon (KR); Sahnggi Park, Daejeon (KR); Gyungock Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 8 days.

(21) Appl. No.: 13/913,905

(22) Filed: Jun. 10, 2013

(65) Prior Publication Data

US 2014/0169729 A1 Jun. 19, 2014

(30) Foreign Application Priority Data

Dec. 17, 2012 (KR) ........................ 10-2012-0147254

(51) Int. Cl.
| | |
|---|---|
| *G02B 6/26* | (2006.01) |
| *G02B 6/42* | (2006.01) |
| *G02B 6/125* | (2006.01) |
| *G02B 6/12* | (2006.01) |

(52) U.S. Cl.
CPC ............ *G02B 6/125* (2013.01); *G02B 6/12011* (2013.01)
USPC .......................................................... 385/32

(58) Field of Classification Search
CPC ............................ G02B 6/125; G02B 6/12011
USPC .................................................................. 385/32
See application file for complete search history.

(56) References Cited

U.S. PATENT DOCUMENTS

| | | | | |
|---|---|---|---|---|
| 7,848,602 | B2 * | 12/2010 | Kim et al. ...................... | 385/46 |
| 7,876,986 | B2 | 1/2011 | Lin et al. | |
| 2012/0027344 | A1 * | 2/2012 | Krijn et al. ..................... | 385/32 |

FOREIGN PATENT DOCUMENTS

| | | |
|---|---|---|
| KR | 10-2009-0106262 A | 10/2009 |
| KR | 10-2010-0070022 A | 6/2010 |

OTHER PUBLICATIONS

Linghua Wang et al., "Athermal Arrayed Waveguide Gratings in Silicon-on-Insulator by Overlaying a Polymer Cladding on Narrowed Arrayed Waveguieds", Applied Optics, Mar. 20, 2012, pp. 1251-1256, vol. 51, No. 9, Optical Society of America.

* cited by examiner

*Primary Examiner* — Ryan Lepisto

(57) ABSTRACT

Provided are a waveguide with a reduced phase error and a photonics device including the same. The waveguide structure may include a lower clad, a core pattern with at least one bending region, on the lower clad, a beam deflecting pattern on the core pattern, and an upper clad covering the core pattern provided with the beam deflecting pattern. The beam deflecting pattern may be formed of a material, whose refractive index may be higher than that of the upper clad and may be lower than or equivalent to that of the core pattern, and the beam deflecting pattern has an increasing and decreasing width or an oscillating width, when measured along the bending region.

16 Claims, 9 Drawing Sheets

Side wall fluctuation

WAVEGUIDE WITH REDUCED PHASE ERROR AND PHOTONICS DEVICE INCLUDING THE SAME

CROSS-REFERENCE TO RELATED APPLICATIONS

This U.S. non-provisional patent application claims priority under 35 U.S.C. §119 to Korean Patent Application No. 10-2012-0147254, filed on Dec. 17, 2012, in the Korean Intellectual Property Office, the entire contents of which are hereby incorporated by reference.

BACKGROUND OF THE INVENTION

Example embodiments of the inventive concept relate to a photonics technology, and in particular, to a waveguide with a reduced phase error and a photonics device including the same.

A silica-based arrayed waveguide grating (AWG) has been used for the optical communication. However, since the silica-based AWG has a size of several square centimeter or more, there are technical difficulties, such as low productivity and an increase in volume of related optical components. To overcome these technical difficulties of the silica-based AWG, there has been suggested a silicon-based AWG configured to have a small size of about several hundred square micrometers.

The silicon-based AWG includes core and clad layers that have a large difference in refractive index. In this case, however, a fluctuation in a sidewall profile of a waveguide may result in various technical problems, such as large phase error, wavelength reproducibility, and cross talk. A curved waveguide is especially vulnerable to the phase error problem caused by the fluctuation in a waveguide sidewall profile.

SUMMARY

Example embodiments of the inventive concept provide a waveguide structure capable of reducing a phase error at a curved waveguide.

Other example embodiments of the inventive concept provide a photonics device having a reduced phase error property.

According to example embodiments of the inventive concept, a waveguide structure may include a lower clad, a core pattern with at least one bending region, on the lower clad, a beam deflecting pattern on the core pattern, and an upper clad covering the core pattern provided with the beam deflecting pattern. The beam deflecting pattern may be formed of a material, whose refractive index may be higher than that of the upper clad and may be lower than or equivalent to that of the core pattern, and the beam deflecting pattern has an increasing and decreasing width or an oscillating width, when measured along the bending region.

In example embodiments, the core pattern may be formed of silicon, the upper clad may be formed of silicon oxide, and the beam deflecting pattern may be formed of silicon nitride.

In example embodiments, the beam deflecting pattern may be formed to have a thickness ranging from 100 nm to 400 nm.

In example embodiments, the beam deflecting pattern may be formed on the bending region to expose partially a top surface of the core pattern.

In example embodiments, the beam deflecting pattern may include at least one portion that may be provided on the bending region and may be tapered toward an outer sidewall of the core pattern.

In example embodiments, on the bending region, the beam deflecting pattern may be formed to have an asymmetric structure.

In example embodiments, the beam deflecting pattern may have two sides that are provided on the bending region to cross the core pattern, are connected to each other adjacent to the outer sidewall of the core pattern, and protrude toward the outside of the beam deflecting pattern to have a convex profile.

In example embodiments, the beam deflecting pattern may have two sides that are provided on the bending region to cross the core pattern, are connected to each other adjacent to the outer sidewall of the core pattern, and are recessed toward the inside of the beam deflecting pattern to have a concave profile.

In example embodiments, the beam deflecting pattern may include at least one triangular pattern provided on the bending region, and the triangular pattern may be formed in such a way that one of its vertexes is adjacent to an outer sidewall of the bending region and the others are adjacent to an inner sidewall of the bending region.

In example embodiments, on the bending region, the beam deflecting pattern may include at least one horizontal portion tapered toward an outer sidewall of the core pattern, and a vertical portion covering an inner sidewall of the core pattern.

In example embodiments, the bending region may be formed to have a width of 1 μm or more.

In example embodiments, the beam deflecting pattern comprises a first linear region connected to a one side of the bending region, the first linear region expanding to a first direction; and a second linear region connected to the other side of the bending region, the second linear region expanding to a second direction being different of the first direction.

According to example embodiments of the inventive concept, a photonics device may include at least one optical component with at least one internal waveguide and a transmission waveguide serving as a path for an optical access to the optical component. The internal waveguide and the transmission waveguide may include a lower clad, a core pattern provided on the lower clad to include at least one bending region, a beam deflecting pattern provided on the core pattern, and an upper clad covering the core pattern provided with the beam deflecting pattern. The beam deflecting pattern may be formed of a material, whose refractive index may be higher than that of the upper clad and may be lower than or equivalent to that of the core pattern, and the beam deflecting pattern has an increasing and decreasing width or an oscillating width, when measured along the bending region.

In example embodiments, the core pattern may be formed of silicon, the upper clad may be formed of silicon oxide, and the beam deflecting pattern may be formed of silicon nitride.

In example embodiments, the beam deflecting pattern may include at least one portion that is provided on the bending region and is tapered toward an outer sidewall of the core pattern.

In example embodiments, the beam deflecting pattern may include at least one triangular pattern provided on the bending region, and the triangular pattern may be formed in such a way that one of its vertexes is adjacent to an outer sidewall of the bending region and the others are adjacent to an inner sidewall of the bending region.

In example embodiments, the bending region may be formed to have a width of 1 μm or more.

In example embodiments, the optical component may constitute one of an arrayed waveguide grating (AWG), a Mach-Zehnder interferometer, an interleaver, and a ring filter.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
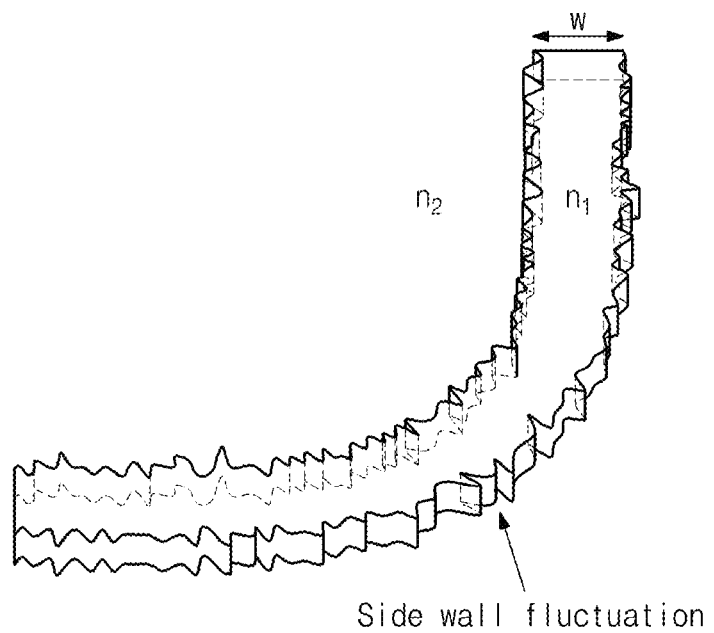
FIG. 1 is a schematic perspective view illustrating an example of curved waveguides having a non-uniform sidewall profile.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a schematic perspective view illustrating an example of curved waveguides having a non-uniform sidewall profile.

Referring to FIG. 1, a photonics device may include a waveguide, whose sidewall is defined by a process of patterning a core layer. In the meantime, in the pattering process, there is a lot of difficulty in realizing a uniform profile of the waveguide sidewall. Accordingly, the sidewall of the waveguide may be formed to have a non-uniform profile, as shown in FIG. 1.

Typically, the core layer may have a higher refractive index than a clad layer to be provided adjacent thereto. That is, the waveguide may be configured to satisfy a condition of n1>n2, where n1 and n2 are refractive indexes of the core and clad layers. However, in the case where a difference in refractive index between the core and clad layers, i.e., Δn=n2−n1, is large, light propagating along the waveguide may be especially vulnerable to a phase error problem, which may be caused by non-uniformity or fluctuation in a sidewall profile of the waveguide.

In the case of linear waveguides, the phase error problem caused by the fluctuation of the waveguide sidewall may be ameliorated by increasing a width W of waveguide. For example, the increase of a waveguide width may reduce an overlap area between the light and the waveguide sidewall, and thus, the phase error problem can be improved.

However, in the case of curved waveguides, owing to the well-known directionality of light, the increase of waveguide width does not contribute to reduce n overlap area between the light and the waveguide sidewall. Accordingly, the curved waveguide may be more vulnerable to the phase error problem, compared to the linear waveguide.

Figure 2:
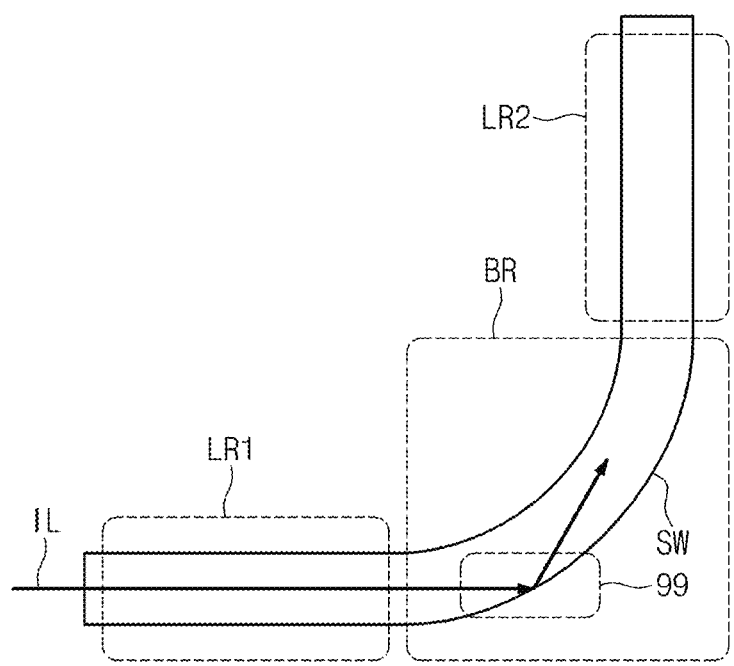
FIG. 2 is a plan view illustrating an example of curved waveguides connecting two linear waveguides that are orthogonal to each other.
Figure 3:
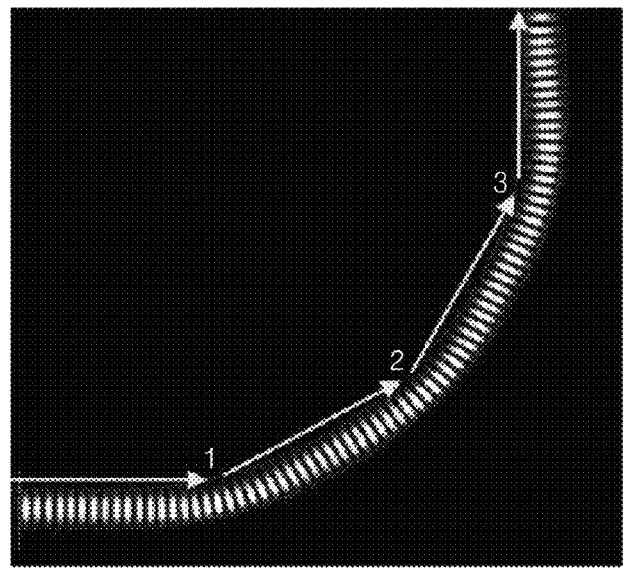
FIG. 3 is a diagram showing a result of finite-difference time-domain (FDTD) simulation performed on the waveguide of FIG. 2.

FIG. 2 is a plan view illustrating an example of curved waveguides connecting two linear waveguides that are orthogonal to each other. FIG. 3 is a diagram showing a result of finite-difference time-domain (FDTD) simulation performed on the waveguide of FIG. 2.

Referring to FIG. 2, an incident light IL may be propagated from a first linear region LR1 to a second linear region LR2 through a bending region BR. Due to directionality of light, the incident light IL may be reflected at several positions 1, 2, and 3 of the bending region BR during its propagation along the bending region BR, as shown in FIG. 3. In other words, FIG. 3 shows that a phase of light to be emitted from the second linear region LR2 may be changed depending on its reflection process in the bending region BR.

Figure 4:
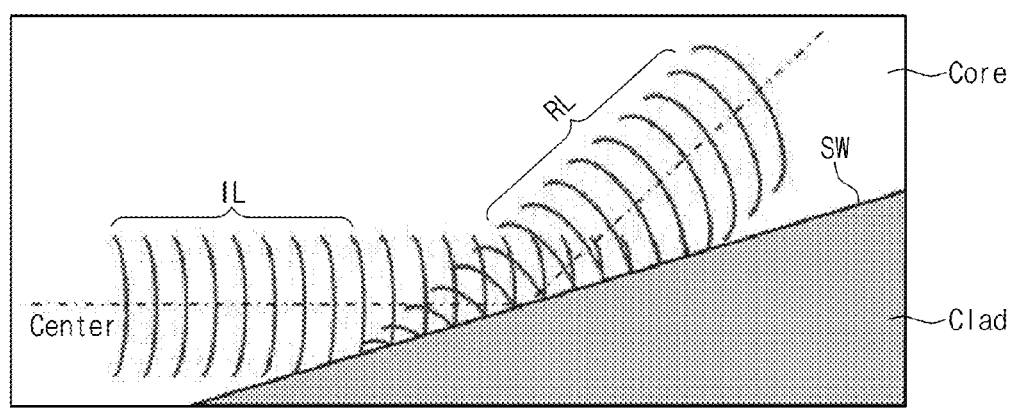
FIG. 4 shows an ideal case that a portion depicted by a dotted line 99 in FIG. 2 has a uniform sidewall profile.
Figure 5:
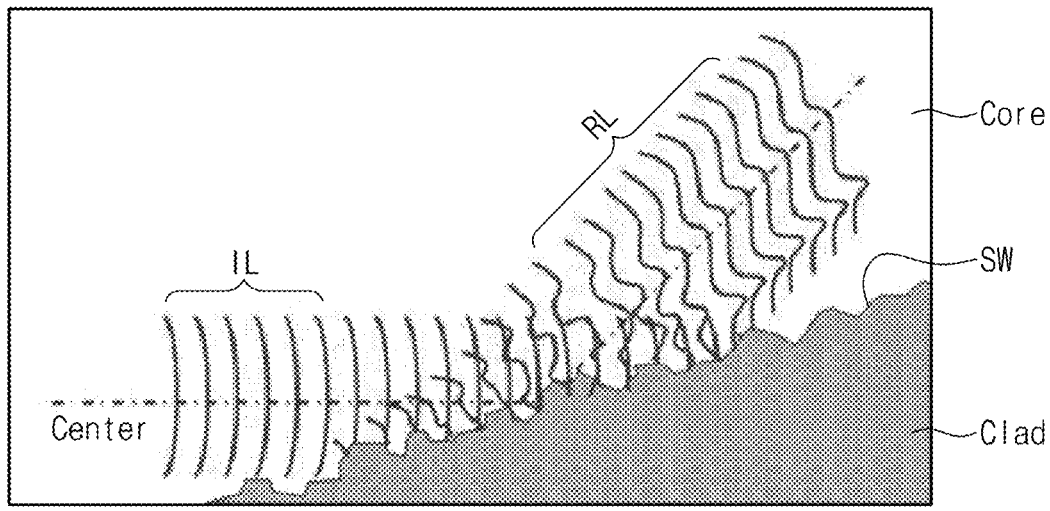
FIG. 5 shows a realistic case that the portion depicted by a dotted line 99 in FIG. 2 has a non-uniform sidewall profile.

FIG. 4 shows an ideal case that a portion depicted by a dotted line 99 in FIG. 2 has a uniform sidewall profile. FIG. 5 shows a realistic case that the portion depicted by a dotted line 99 in FIG. 2 has a non-uniform sidewall profile.

In an ideal case where a sidewall SW of the bending region BR is uniform as shown in FIG. 4, the incident light IL may be reflected from the sidewall SW of the bending region BR without any phase change or distortion. In other words, it is possible to prevent a phase change from occurring substantially between the incident light IL and a reflected light RL that are incident into and reflected from the sidewall SW of the bending region BR.

By contrast, in a realistic case where the sidewall SW of the bending region BR has a non-uniform profile, a wavefront of the incident light IL may be distorted after it meets the sidewall SW of the bending region BR, as shown in FIG. 5. Accordingly, the reflected light RL to be emitted through the second linear region LR2 may have a distorted phase. Such a distortion in phase of the reflected light RL may result in a phase error of photonics devices, such as an arrayed waveguide grating, a Mach-Zehnder interferometer, an interleaver, and a ring filter.

Figure 6:
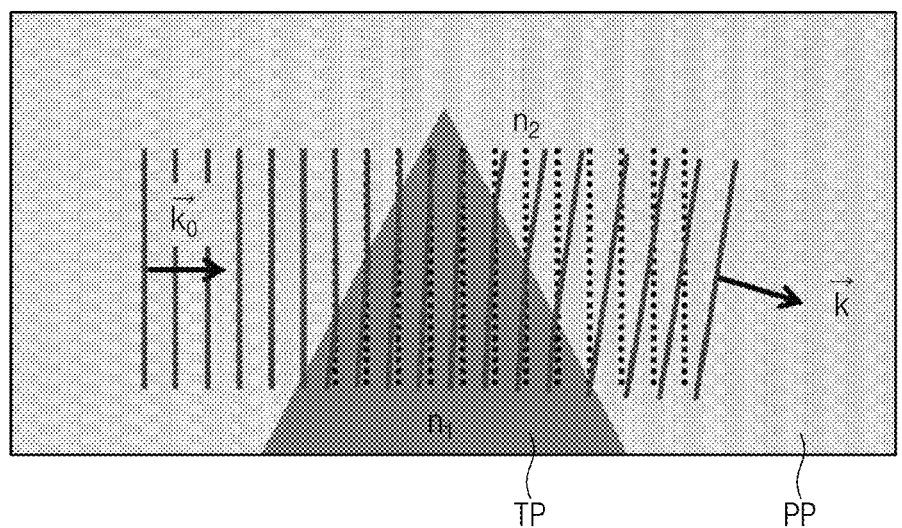
FIG. 6 is a schematic diagram provided to explain one aspect of a waveguide structure, according to example embodiments of the inventive concept.

FIG. 6 is a schematic diagram provided to explain one aspect of a waveguide structure, according to example embodiments of the inventive concept.

If as shown in FIG. 6 a triangular pattern TP with a refractive index of n1 is provided on a propagation path of light and is surrounded by a neighboring material with a refractive index of $n_2$ that is smaller than n1, light has speeds of V2 ($=c/n_2$) in the neighboring material and of V1 ($=c/n_1$) in the triangular pattern, where c is the light speed in vacuum. Such a difference of the light speed may result in a change in propagation direction of light between before and after incidence to the triangular pattern. As will be described in detail below, the change in propagation direction of light may be used to reduce dependency of light traveling along a curved waveguide on a waveguide sidewall.

Figure 7:
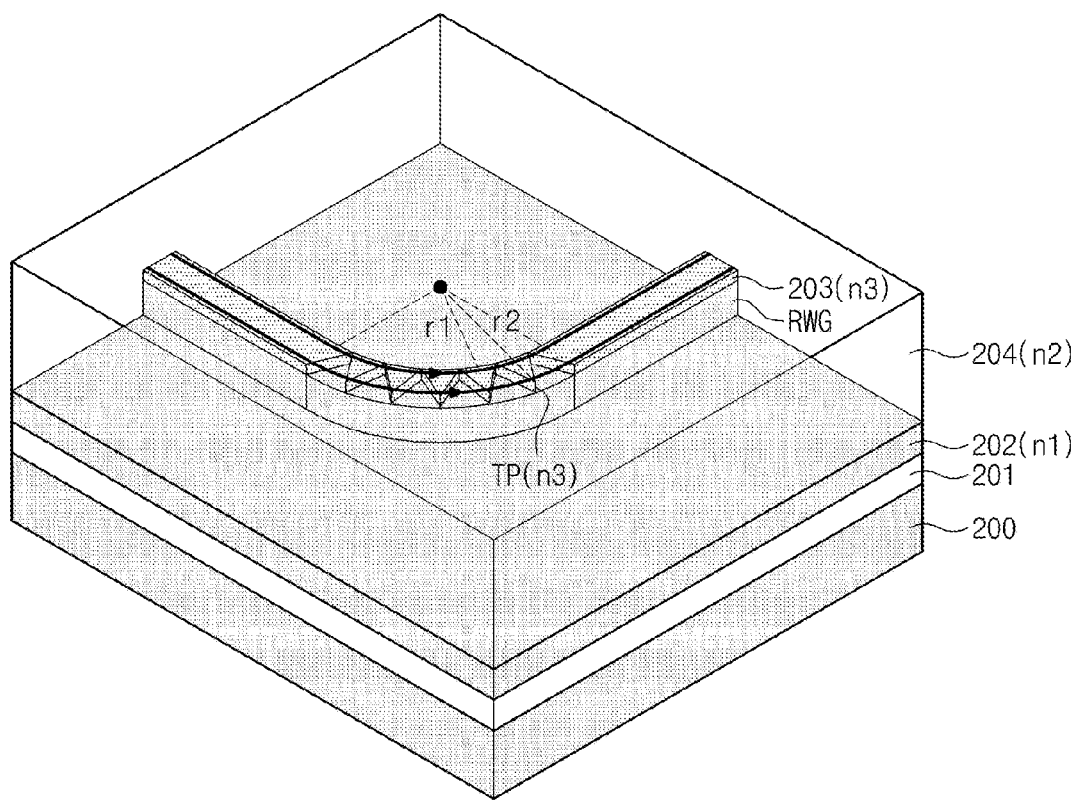
FIG. 7 is a perspective view illustrating a waveguide according to example embodiments of the inventive concept.

FIG. 7 is a perspective view illustrating a waveguide according to example embodiments of the inventive concept.

Referring to FIG. 7, according to example embodiments of the inventive concept, a waveguide structure may include a lower clad 201, a core layer 202, a beam deflecting pattern 203, and an upper clad 204 that are sequentially stacked on a substrate 200.

In example embodiment, the substrate 200 may be a silicon wafer, and the core layer 202 may be formed of silicon, silicon nitride, or InP. The lower and upper clads 201 and 204 may be formed of one of materials having a refractive index smaller than that of the core layer 202. For example, the lower and upper clads 201 and 204 may be formed of a silicon oxide layer.

In example embodiments, the beam deflecting pattern 203 may be formed of a material, whose refractive index is lower than or equivalent to that of the core layer 202 and is higher than that of the upper clad 204. For example, the core layer 202, the upper clad 204, and the beam deflecting pattern 203 may be formed of materials satisfying a condition of n1>n3>n2, where n1, n2 and n3 are refractive indexes of the core layer 202, the upper clad 204, and the beam deflecting pattern 203. For example, if the core layer 202 and the upper clad 204 are formed of silicon and silicon oxide, respectively, the beam deflecting pattern 203 may be formed of a silicon nitride layer or a silicon oxynitride layer.

However, it is obvious to a skilled person having regard to the state of the art that example embodiments of the inventive concepts are not limited to the materials enumerated above. In other words, other known materials may be used to realize the technical concept of the present invention, if they are selected to satisfy the above refractive index condition of materials.

The core layer 202 may be patterned to form a rib waveguide RWG, whose sidewall may be covered with the upper clad 204. The rib waveguide RWG may be formed to have a bending region, as shown. The beam deflecting pattern 203 may include at least one triangular pattern TP provided on the bending region. For example, the beam deflecting pattern 203 may be formed to expose partially a top surface of the rib waveguide RWG. The top surface of the rib waveguide RWG exposed by the beam deflecting pattern 203 may be covered with the upper clad 204. The triangular pattern TP may be formed in such a way that one of its vertices is located adjacent to an outer curved sidewall of the bending region and the others are located adjacent to an inner curved sidewall of the bending region.

As the result of this disposition of the triangular patterns TP, an effective refractive index of the bending region may vary from the inner curved sidewall of the bending region to the outer curved sidewall. For example, if $n_{eff\_r1}$ and $n_{eff\_r2}$ are effective refractive indexes of curved paths having radii of r1 and r2, respectively, they may satisfy the following inequality.

$$n_{eff\_r1} > n_{eff\_r2}$$

In other words, as the result of this difference between effective refractive indexes, light traveling along the path with the radius of r1 may have a reduced speed, compared with light traveling along the path with the radius of r2. This difference of the light speed may lead to a change in a propagation direction of light traveling along the rib waveguide RWG, as will be described in more detail with reference to FIG. 8.

Figure 8:
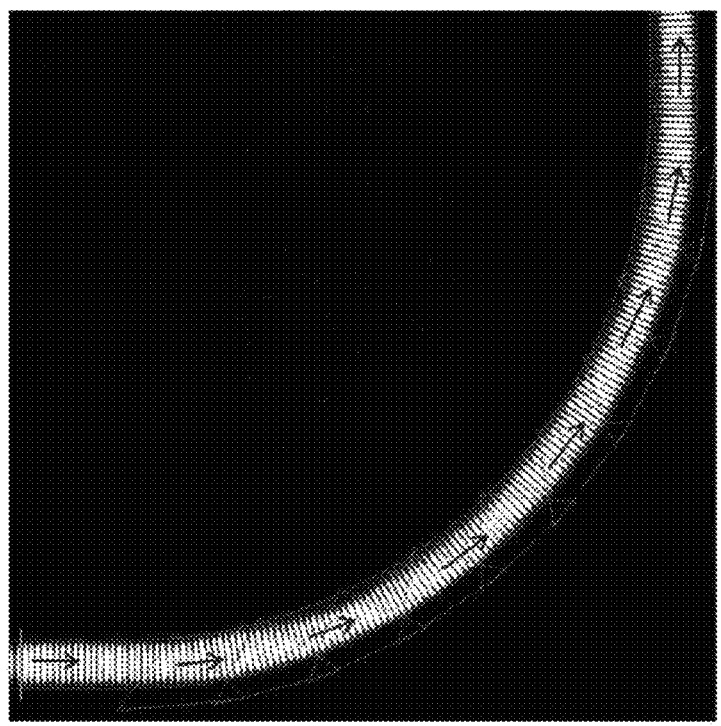
FIG. 8 is a diagram showing a result of FDTD simulation performed on a bending region, on which triangular patterns are provided.

FIG. 8 is a diagram showing a result of FDTD simulation performed on a bending region, on which triangular patterns are provided. The simulation of FIG. 8 was performed to a waveguide structure formed on a SOI wafer, as shown in FIG. 7, and its input parameters are as follows:

TABLE 1

| Material of the core layer 202 | Si |
| Thickness of the core layer 202 | 220 nm |
| Material of the beam deflecting pattern 203 | $Si_3N_4$ |
| Thickness of the beam deflecting pattern 203 | 200 nm |
| Material of the upper clad 204 | $SiO_2$ |
| Width of the rib waveguide RWG | 2 μm |
| curvature radius of the bending region | 20 μm |

Referring to FIG. 8, an incident light was not substantially in contact with a sidewall of a bending region, during its propagation along the waveguide. Furthermore, even though the waveguide had a width of 2 nm that is greater than a width (i.e., 0.5 nm) required for multimode, the incident light maintained a single mode, during its propagation. This result shows that the use of the beam deflecting pattern 203 including the triangular patterns TP can contribute to reduce the phase error problem, which may be caused by a sidewall of a bending region of waveguide.

Figure 9:
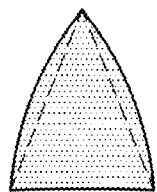
FIGS. 9 through 15 are diagrams schematically illustrating examples of a beam deflecting pattern according to example embodiments of the inventive concept.
Figure 10:
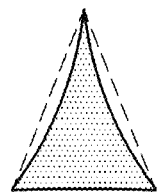
Figure 11:
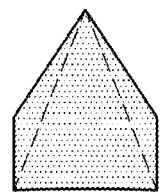
Figure 12:
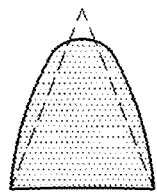
Figure 13:
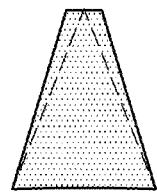
Figure 14:
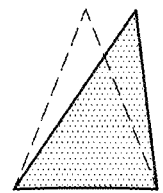

According to example embodiments of the inventive concept, the phase error problem to be caused by a waveguide sidewall may be reduced by making a path-dependent difference in effective refractive index along the bending region of the waveguide. However, example embodiments of the inventive concepts may not be limited to the use of the triangular pattern of FIG. 6. For example, the path-dependent difference in effective refractive index may be achieved by forming the beam deflecting pattern 203, which may be shaped like a triangle with convex or concave sidewalls as shown in FIG. 9 or 10, a polygon as shown in FIG. 11, a triangle with a rounded vertex as shown in FIG. 12, a trapezoid as shown in FIG. 13, or an asymmetric pattern as shown in FIG. 14, on the bending region. This modification in shape of the beam deflecting pattern 203 may be applied in consideration of the material and thickness of the core layer 202, the material and thickness of the beam deflecting pattern 203, the material of the upper clad 204, the width of the rib waveguide RWG, the curvature radius of the bending region of the rib waveguide RWG, and so forth.

Figure 15:
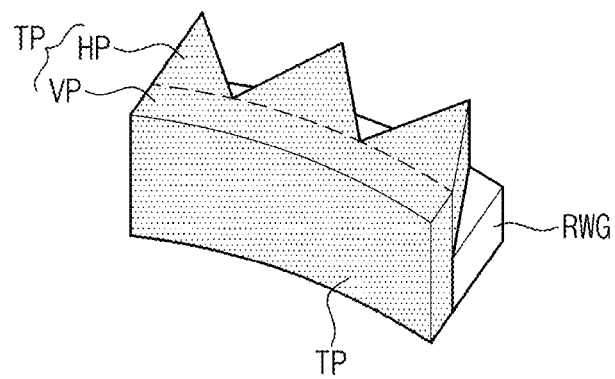

Furthermore, in other embodiments, as shown in FIG. 15, the beam deflecting pattern 203 may be formed on the bending region to cover the inner sidewall of the rib waveguide RWG. For example, the beam deflecting pattern 203 may include a horizontal portion HP covering the top surface of the rib waveguide RWG and a vertical portion VP covering the inner sidewall of the rib waveguide RWG, on the bending region.

Figure 16:
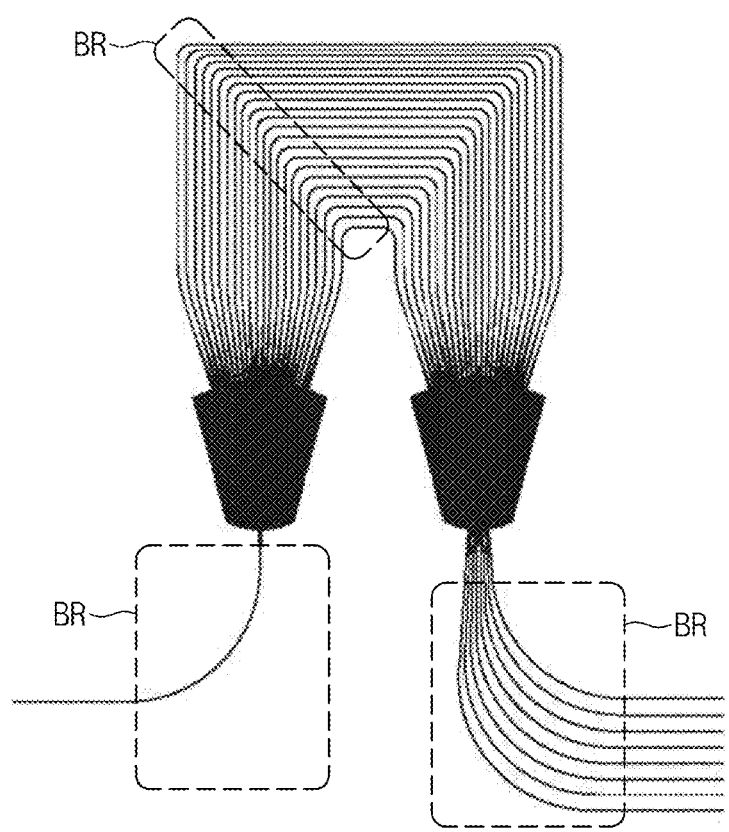
FIGS. 16 through 18 are diagrams schematically illustrating examples of a photonics device including a waveguide according to example embodiments of the inventive concept.
Figure 17:
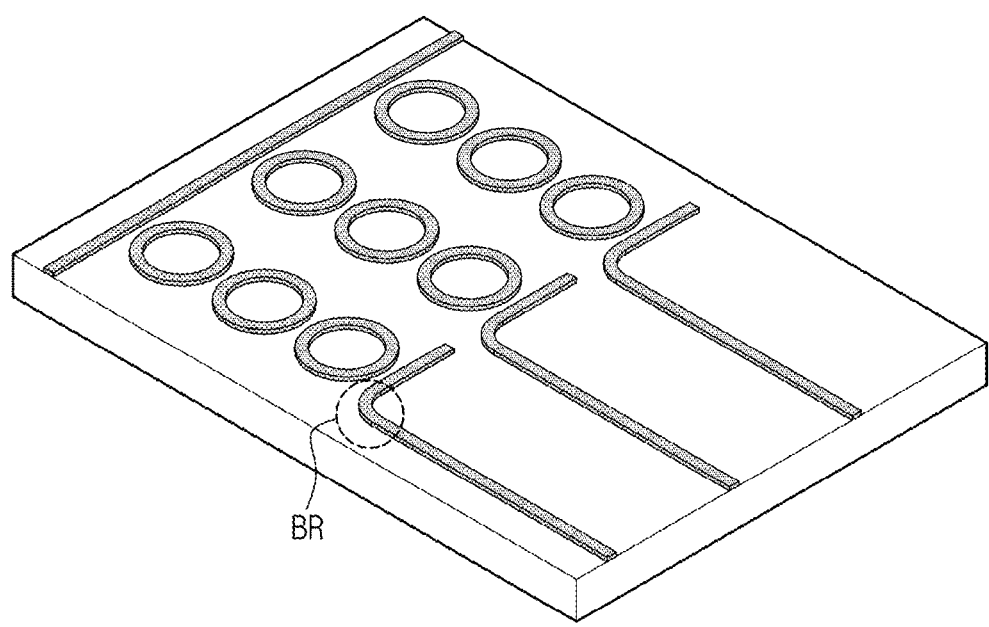
Figure 18:
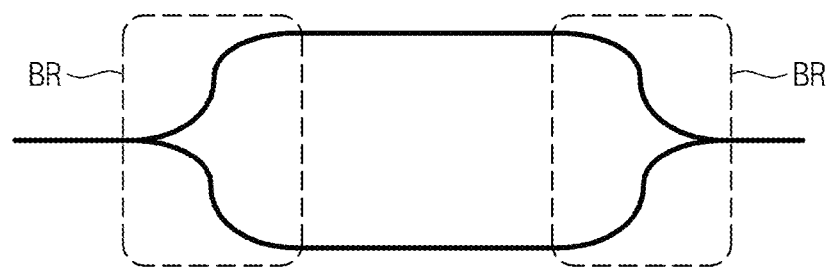

The beam deflecting pattern 203 including the triangular patterns TP may be used to suppress technical problems related to a sidewall profile of a bending region BR, which may be a portion of an AWG, a ring filter, and a Mach-Zehnder interferometer that are shown in FIGS. 16, 17 and 18, respectively. For all that, the AWG, the ring filter, and the Mach-Zehnder interferometer may be examples of waveguide structures, to which according to example embodiments of the inventive concept can be applied, but example embodiments of the inventive concepts may not be limited thereto.

According to example embodiments of the inventive concept, a waveguide may include a curved portion, whose effective refractive index is different between on inside and outside paths. For example, on a core layer, a triangular pattern may be provided to have a refractive index that is between those of core and clad layers. Due to the difference of effective refractive index, light may have different propagation speeds at inside and outside paths of the curved portion. In other words, the propagation of light may be bent along the curved portion of the waveguide. This means that the light can be substantially spaced apart from a sidewall of the curved portion, during its propagation on the curved portion of the waveguide. Accordingly, the phase error problem, which may be caused by a uniform sidewall profile of the curved waveguide, can be suppressed in the waveguide or the photonics device according to example embodiments of the inventive concept.

While example embodiments of the inventive concepts have been particularly shown and described, it will be understood by one of ordinary skill in the art that variations in form and detail may be made therein without departing from the spirit and scope of the attached claims.

What is claimed is:

1. A waveguide structure, comprising:
a lower clad;
a core pattern with at least one bending region, on the lower clad;
a beam deflecting pattern on the core pattern; and
an upper clad covering the core pattern provided with the beam deflecting pattern,
wherein the beam deflecting pattern is formed of a material, whose refractive index is higher than that of the upper clad and is lower than or equivalent to that of the core pattern, and the beam deflecting pattern has an increasing and decreasing width or an oscillating width, when measured along the bending region, and
wherein the beam deflecting pattern includes at least one triangular pattern provided on the bending region, and a vertex of the triangular pattern is adjacent to an outer sidewall of the bending region and the remaining vertices of the triangular region are adjacent to an inner sidewall of the bending region.

2. The waveguide structure of claim 1, wherein the core pattern is formed of silicon, the upper clad is formed of silicon oxide, and the beam deflecting pattern is formed of silicon nitride.

3. The waveguide structure of claim 2, wherein the beam deflecting pattern is formed to have a thickness ranging from 100 nm to 400 nm.

4. The waveguide structure of claim 1, wherein the beam deflecting pattern is formed on the bending region to expose partially a top surface of the core pattern.

5. The waveguide structure of claim 1, wherein the beam deflecting pattern further includes at least one portion that is provided on the bending region and is tapered toward an outer sidewall of the core pattern.

6. The waveguide structure of claim 1, wherein, on the bending region, the beam deflecting pattern is formed to have an asymmetric structure.

7. The waveguide structure of claim 1, wherein the triangular pattern has two sides that are provided on the bending region to cross the core pattern, and wherein the two sides are connected to each other, adjacent to the outer sidewall of the core pattern and curved outward to have a convex profile.

8. The waveguide structure of claim 1, wherein the triangular pattern has two sides that are provided on the bending region to cross the core pattern, and wherein the two sides are connected to each other adjacent to the outer sidewall of the core pattern and curved inward to have a concave profile.

9. The waveguide structure of claim 1, wherein on the bending region, the beam deflecting pattern further includes:
   at least one horizontal portion tapered toward an outer sidewall of the core pattern; and
   a vertical portion covering an inner sidewall of the core pattern.

10. The waveguide structure of claim 1, wherein the bending region is formed to have a width of 1 μm or more.

11. The waveguide structure of claim 1, wherein the beam deflecting pattern further includes:
   a first linear region connected to a first side of the bending region, the first linear region extending in a first direction; and
   a second linear region connected to a second side of the bending region, the second linear region extending in a second direction that is different of the first direction.

12. A photonics device comprising at least one optical component with at least one internal waveguide and a transmission waveguide serving as a path for an optical access to the optical component,
   wherein the internal waveguide and the transmission waveguide includes:
      a lower clad;
      a core pattern provided on the lower clad to include at least one bending region;
      a beam deflecting pattern provided on the core pattern; and
      an upper clad covering the core pattern provided with the beam deflecting pattern, and
   wherein the beam deflecting pattern is formed of a material, whose refractive index is higher than that of the upper clad and is lower than or equal to that of the core pattern, and the beam deflecting pattern has an increasing and decreasing width or an oscillating width, when measured along the bending region,
   wherein the beam deflecting pattern has at least one triangular pattern provided on the bending region, and a vertex of the triangular pattern is adjacent to an outer sidewall of the bending region and the remaining vertices of the triangular region are adjacent to an inner sidewall of the bending region.

13. The photonics device of claim 12, wherein the core pattern is formed of silicon, the upper clad is formed of silicon oxide, and the beam deflecting pattern is formed of silicon nitride.

14. The photonics device of claim 12, wherein the beam deflecting pattern further has at least one portion that is provided on the bending region and is tapered toward an outer sidewall of the core pattern.

15. The photonics device of claim 12, wherein the bending region is formed to have a width of 1 μm or more.

16. The photonics device of claim 12, wherein the optical component constitutes one of an arrayed waveguide grating (AWG), a Mach-Zehnder interferometer, an interleaver, and a ring filter.

* * * * *